United States Patent
Greenfield

(10) Patent No.: US 10,070,096 B1
(45) Date of Patent: *Sep. 4, 2018

(54) AUTOMATIC PLAYBACK OVERSHOOT CONTROL SYSTEM AND METHOD

(71) Applicant: CSC Holdings, LLC, Bethpage, NY (US)

(72) Inventor: Jonathan Greenfield, Miller Place, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,351

(22) Filed: Oct. 25, 2016

Related U.S. Application Data

(63) Continuation of application No. 12/788,934, filed on May 27, 2010, now Pat. No. 9,503,776.

(51) Int. Cl.

| | |
|---|---|
| *H04N 5/84* | (2006.01) |
| *H04N 9/80* | (2006.01) |
| *H04N 5/783* | (2006.01) |
| *H04N 21/432* | (2011.01) |
| *H04N 21/4147* | (2011.01) |

(52) U.S. Cl.
CPC ......... *H04N 5/783* (2013.01); *H04N 21/4147* (2013.01); *H04N 21/4325* (2013.01)

(58) Field of Classification Search
USPC .................................................. 386/343–352
See application file for complete search history.

(56) References Cited

U.S. PATENT DOCUMENTS

| | | |
|---|---|---|
| 6,850,691 B1 | 2/2005 | Stam et al. |
| 7,493,015 B1 | 2/2009 | Van Stam et al. |
| 7,954,128 B2 | 5/2011 | Maynard et al. |
| 2002/0178453 A1 | 11/2002 | Jun et al. |
| 2008/0152301 A1* | 6/2008 | Cho ....................... H04N 5/783 386/343 |
| 2011/0262111 A1 | 10/2011 | Thornberry et al. |
| 2011/0293252 A1 | 12/2011 | Greenfield |

* cited by examiner

*Primary Examiner* — Hung Dang
(74) *Attorney, Agent, or Firm* — Sterne, Kessler, Goldstein & Fox P.L.L.C.

(57) ABSTRACT

An automatic overshoot control system and method can enable a user to more easily terminate a trick mode (e.g., fast forward or rewind) at an intended point in program material. For example, after a trick mode, a user can initiate display of audio or video at a particular intended point in the program material while minimizing a need to manually adjust. The system determines an offset and tracks a preview position within the program material displayed as a trick mode preview incorporating the offset. The system also tracks an actual position within the program material based on the preview position and offset. The actual position corresponds to a predicted location that the user desires upon terminating the preview trick mode. When the preview trick mode is terminated, normal playback of the program material is resumed at the actual location corresponding to the user's intended location in the program material.

20 Claims, 9 Drawing Sheets

AUTOMATIC PLAYBACK OVERSHOOT CONTROL SYSTEM AND METHOD

CROSS-REFERENCE TO RELATED APPLICATIONS

The present application is a continuation of U.S. patent application Ser. No. 12/788,934, filed May 27, 2010, now U.S. Pat. No. 9,503,776, which is incorporated herein by reference in its entirety.

BACKGROUND

Field of the Invention

Embodiments relate generally to viewing program material, and more particularly to previewing program material using a preview trick mode.

Background Art

Program material including an audio or video source can be experienced on a variety of devices, including video cassette recorder (VCR) devices, digital video recorder (DVR) devices, digital video disc (DVD) devices, computer-implemented video and audio playback devices, and other set top box devices. A set top box, or STB, can be deployed at a user's household to provide the user with the ability to control delivery of video programming distributed from a provider. The user can issue control commands to control playback of the program material.

A trick mode (e.g., fast forward or rewind) can be used to scan program material. A user can use a trick mode to scan through program material at an increased rate, and, for example, terminate the trick mode to resume normal playback. However, human reaction times associated with user interaction can cause users to overshoot the point at which they wish to stop fast forwarding or rewinding, and resume normal playback at an unintended point in the program material. As a result, the user may often need to manually adjust the current position within the program material after completing the trick play mode. For example, after terminating fast forward mode, the user may need to rewind slightly, in order to adjust for overshooting and reach the intended position.

Conventional systems to address overshooting can involve calculating an overshoot correction to be applied after trick mode is terminated. Application of the overshoot correction in the case of fast forward can involve subtracting a calculated positional offset from the termination point after the trick mode. In the case of rewind, application of the overshoot correction can involve adding a calculated positional offset from the termination point.

However, user sensitivity to variations or delays can be increased in association with terminating a trick mode, because the user can be actively seeking a specific point in the program material. Accordingly, an overall user experience can be degraded for users of conventional systems having delays associated with calculating an overshoot correction after termination of trick modes.

What is needed is an arrangement that enables significant flexibility and accuracy associated with viewing data, including a system to automatically address overshoot associated with terminating trick play modes. Furthermore, what is needed is an arrangement that enables a high degree of control and specificity, while minimizing impact to user experience upon terminating trick modes.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Figure 1:
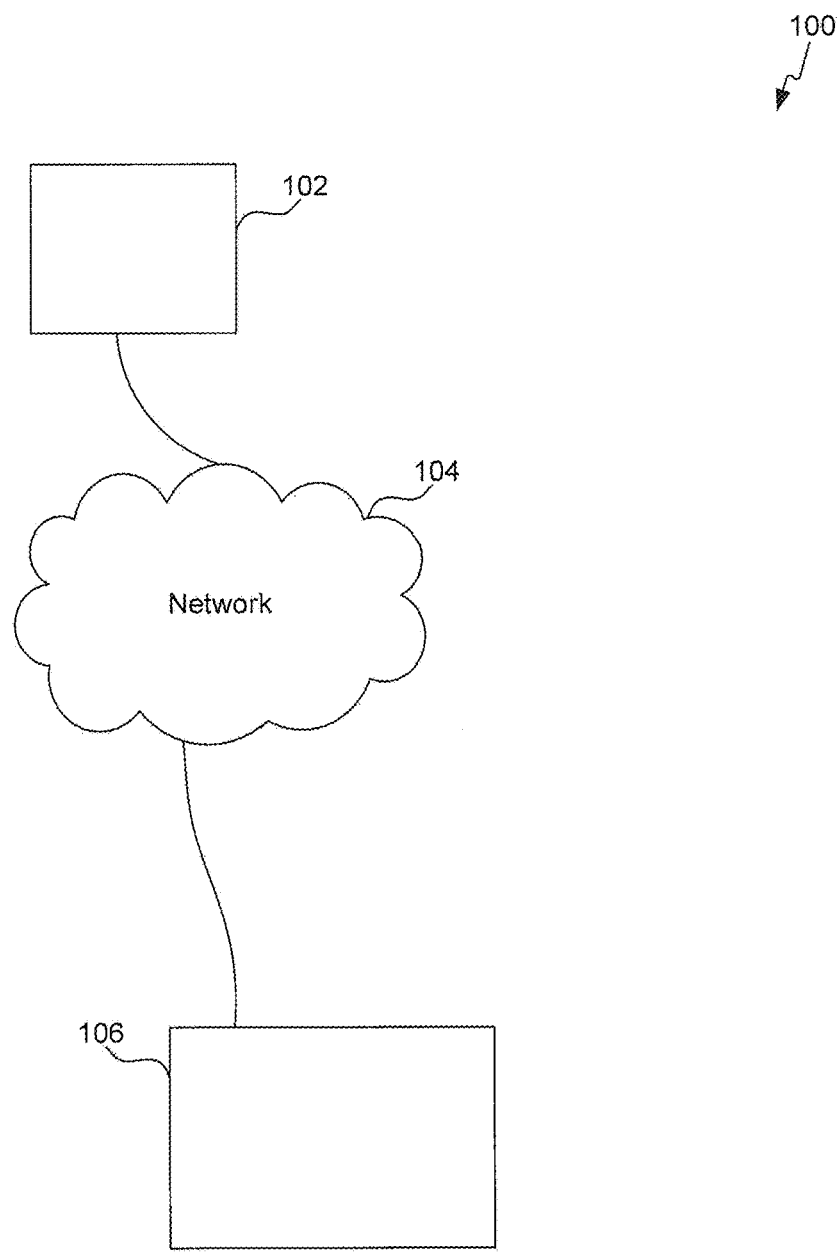
FIG. 1 is a block diagram illustrating an architecture of a program material delivery system according to an embodiment.

FIG. 1 is a block diagram illustrating an architecture 100 of an exemplary program material delivery system according to an embodiment. Video system 100 includes headend 102, network 104, and STB 106. Exemplary STB 106 can include, without limitation, an Internet Protocol (IP)-based (i.e., IPTV) STB. Embodiments are not limited to this exemplary STB interfacing with network 104, and it would be apparent to those skilled in the art that other STBs and local storage delivery systems can be used in embodiments described herein, including personal computers, video cassette recorder (VCR) devices, digital video disc (DVD) devices, or other video and audio playback devices. Many additional STBs can be used with the system 100, although only STB 106 is illustrated in FIG. 1.

STB 106 is coupled to a headend 102 through communication links or network 104. Although not illustrated, additional STBs can be coupled to the headend 102 via the network 104, such that aggregated data can be collected from multiple STBs. The STB 106 receives operational commands from a user, including commands to initiate trick modes (e.g., fast forward, rewind, etc.). A remote control (not shown) may be used to control operation of STB 106. Some STBs may have controls thereon not requiring the use of a remote control. The remote control is configured with buttons to control the STB 106, including play, pause, stop, trick modes, etc.

Arrangements according to the present invention can provide a "preview" trick mode enabling improved user interaction with program material. The preview can be associated with a position in the program material that is offset relative to an "actual" position of the program material. The offset can be associated with a reaction time of the user, adjusted to enable the user to terminate the preview at a desired location in the program material. The offset also can be adjusted in view of a trick mode speed.

Figure 2A:
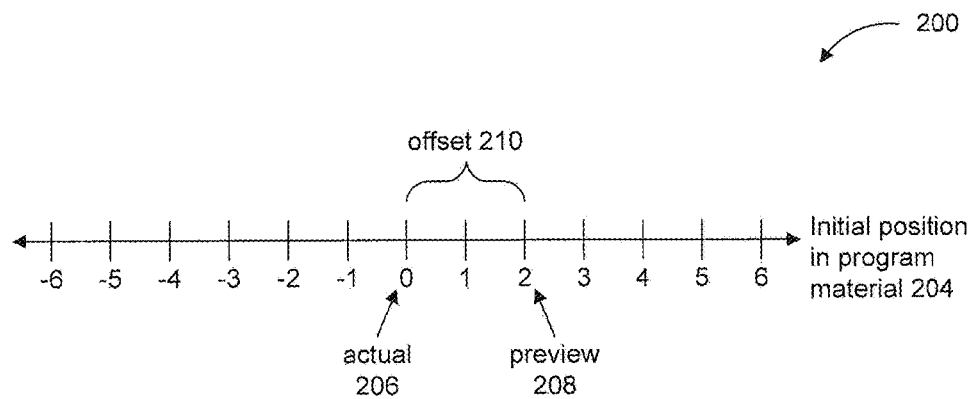
FIG. 2A is a timeline illustrating an offset associated with positions in program material according to an embodiment.

FIG. 2A is a timeline 200 illustrating an offset 210 associated with initial positions in program material 204 according to an embodiment. As illustrated, the offset 210 corresponds to a positional difference of two seconds in program material 204. Actual position 206 is located at 0, and preview position 208 is located at 2. The actual position 206 corresponds to a current position in the program material upon initiating a trick mode.

The situation of FIG. 2A can be associated with a 4× fast forward trick mode preview and a half second user reaction time. For example, a user may require a half second of reaction time in order to react to viewing a desired position in the program material and issue a command to interact with the system and terminate the trick mode preview (e.g., resume playback). A fast forward trick mode can utilize a nominal trick mode speed of 4×, corresponding to a normal playback speed multiplied by four. A positional difference, or offset 210, therefore can be calculated by multiplying the user reaction time (a half second) and the trick mode speed (4×) to get a 2 second positional offset 210. Because the trick mode preview is fast forward, the offset 210 is added to the actual position 206 to determine the preview 208. In other words, the actual position 206 effectively follows the preview position 208 during display of the preview trick mode.

The preview position 208 can be used to display the preview trick mode (in this case, a preview fast forward). The system displays a preview fast forward starting at the preview position 208 of the program material 204. As the preview fast forward is displayed, the preview position 208 is updated to follow along with the display of the preview fast forward.

Additionally, the actual position 206 is also updated along with the preview position 208, while accounting for the offset 210. In the case of fast forward, the actual position 206 remains behind the preview position 208 by the offset 210 as the preview position 208 advances. In the illustrated example, the actual position 206 remains a constant two seconds behind the preview position 208, accounting for the half second user reaction time and the 4× fast forward trick mode speed.

The actual position 206 can be used to position the program material upon termination of the trick mode, by resetting the displayed position to the current actual position upon termination. The actual position 206 thereby accounts for user reaction time and overshoot. For example, the preview 4× fast forward trick mode can display to the user a desired point in the program material. The user can decide to command the system to terminate the preview fast forward, and resume normal play. In the illustrated example, the user introduces a half second reaction time delay before the system receives the play command. During the half second delay, the preview 4× fast forward displays an additional two seconds of program material while advancing beyond (overshooting) the desired point in the program material.

Figure 2B:
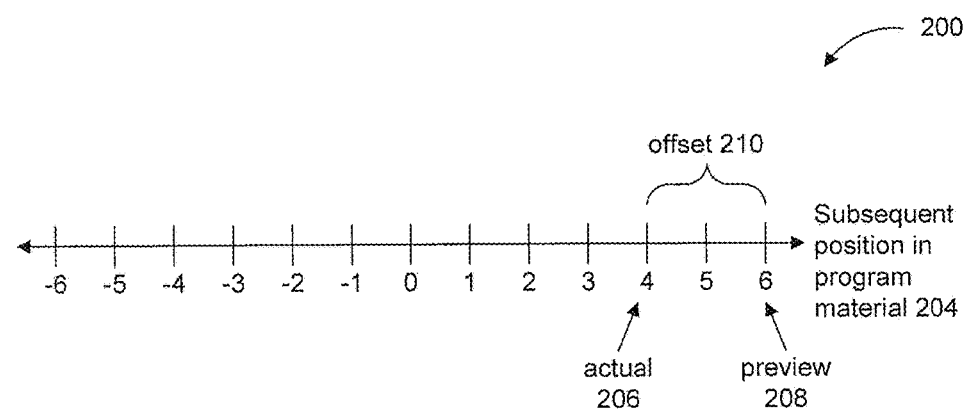
FIG. 2B is a timeline illustrating an offset associated with positions in program material according to an embodiment.

FIG. 2B shows timeline 200 illustrating positions in program material 204 subsequent to displaying the trick mode. The actual position 206 has been advancing along with the preview position 208, following by a two second offset 210. Accordingly, when the system resumes playback at the actual position 206, the desired position in the program material will be displayed. Thus, the system automatically accounts for user reaction time and overshoot.

The system can continuously track/update both the actual position 206 and the preview position 208 within the program material during a trick mode preview. A need to apply overshoot positional correction factors after trick mode is terminated is therefore eliminated. For example, embodiments can calculate an offset 210 prior to or at the time that the user issues a command to initiate a trick mode. Upon initiating the trick mode, the system continues tracking the actual position 206 corresponding to the current position in the program material. The offset 210 from the actual position 206 corresponds to the predicted preview position 208 that enables the user to terminate the trick mode at the desired location.

Figure 3A:
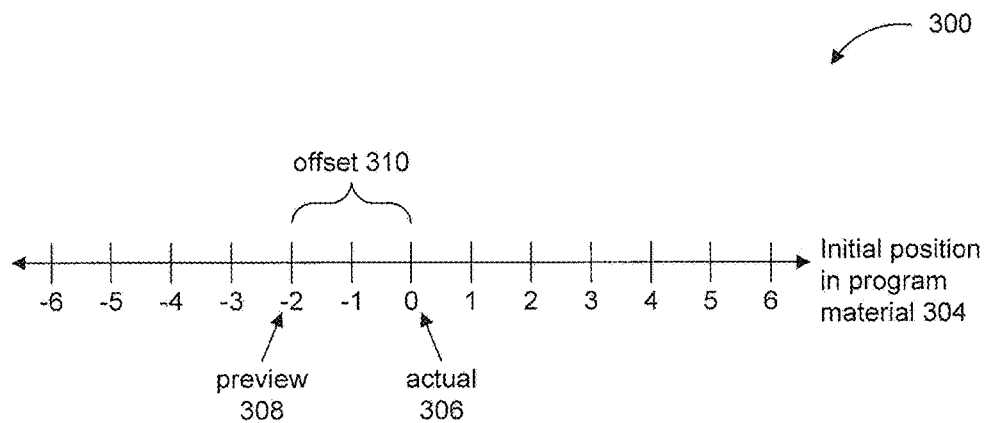
FIG. 3A is a timeline illustrating an offset associated with positions in program material according to another embodiment.

FIG. 3A is a timeline 300 illustrating an offset 310 associated with initial actual position 306 and initial preview position 308 in program material 304 according to another embodiment. The offset 310 has been subtracted from actual position 306, representing a rewind trick mode. Actual position 306 is located at position 0 in the program material 304, initially corresponding to the current location upon initiating a trick mode. Accordingly, preview position 308 is located at position −2 in the program material.

When a user initiates a rewind trick mode according to the embodiment of FIG. 3, the system continues tracking the actual position 306 corresponding to the current position in the program material. The system determines the offset 310, based on a user reaction time (a half second) and a rate of the trick mode (4×), for example. Because the trick mode is 4× rewind, the system subtracts the offset 310 from the actual position 306 to determine the preview position 308.

Accordingly, the system displays a 4× rewind preview trick mode to the user starting at preview position 308 of the program material 304. The preview position 308 is updated according to display of the preview trick mode, and the actual position 306 is similarly updated. Accordingly, the offset 310 between the actual position 306 and the preview position 308 is maintained.

Figure 3B:
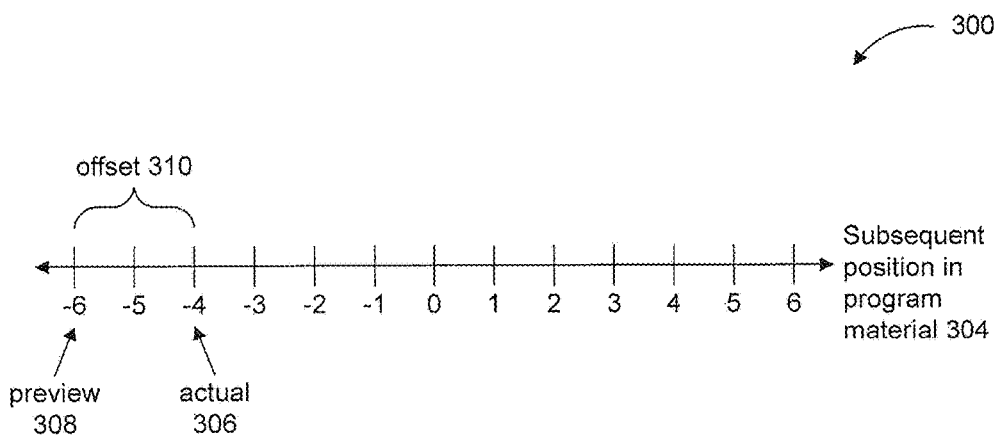
FIG. 3B is a timeline illustrating an offset associated with positions in program material according to another embodiment.

FIG. 3B shows timeline 300 illustrating positions in program material 304 subsequent to displaying the trick mode. Upon termination of the trick mode, the system resumes displaying the program material at the actual position 306. For example, the system resumes playback at actual position 306, accounting for overshoot caused by the speed of the trick mode and user reaction time.

Figure 4:
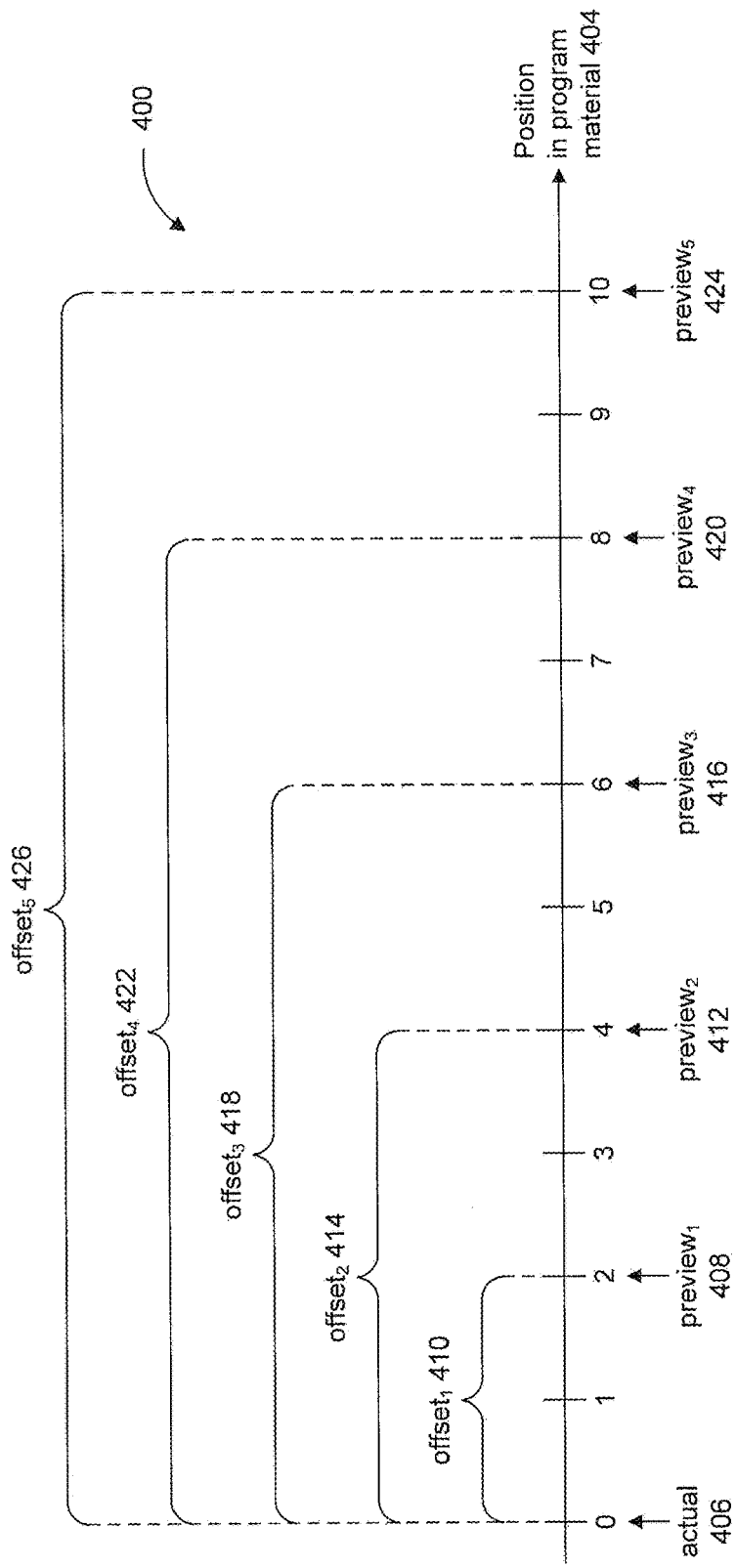
FIG. 4 is a timeline illustrating offsets associated with positions in program material according to an embodiment.

FIG. 4 is a timeline 400 illustrating a plurality of offsets associated with a plurality of positions in program material 404 according to an embodiment. The system can support trick modes that display program material at various speeds. For example, a system can include fast forward at nominal speeds including 4×, 8×, 12×, 16×, 20×, and so on.

For a given user reaction time, e.g., a half second, the system can calculate corresponding offsets by multiplying the half second by the various speeds 4×, 8×, 12×, 16×, 20×, and so on. For example, using these nominal speeds and a half second reaction time, offset$_1$ 410 is two seconds, offset$_2$ 414 is four seconds, offset$_3$ 418 is six seconds, offset$_4$ 422 is eight seconds, and offset$_5$ 426 is ten seconds. For a given actual position 406 at position 0 in program material 404, offsets$_{1...5}$ can be added to actual position 406 to determine preview$_{1...5}$ positions. For example, preview$_1$ 408 is located at position 2, preview$_2$ 412 is located at position 4, preview$_3$ 416 is located at position 6, preview$_4$ 420 is located at position 8, and preview$_5$ 424 is located at position 10. As illustrated, adding offsets$_{1...5}$ to actual position 406 corresponds to fast forward trick modes.

Figure 5:
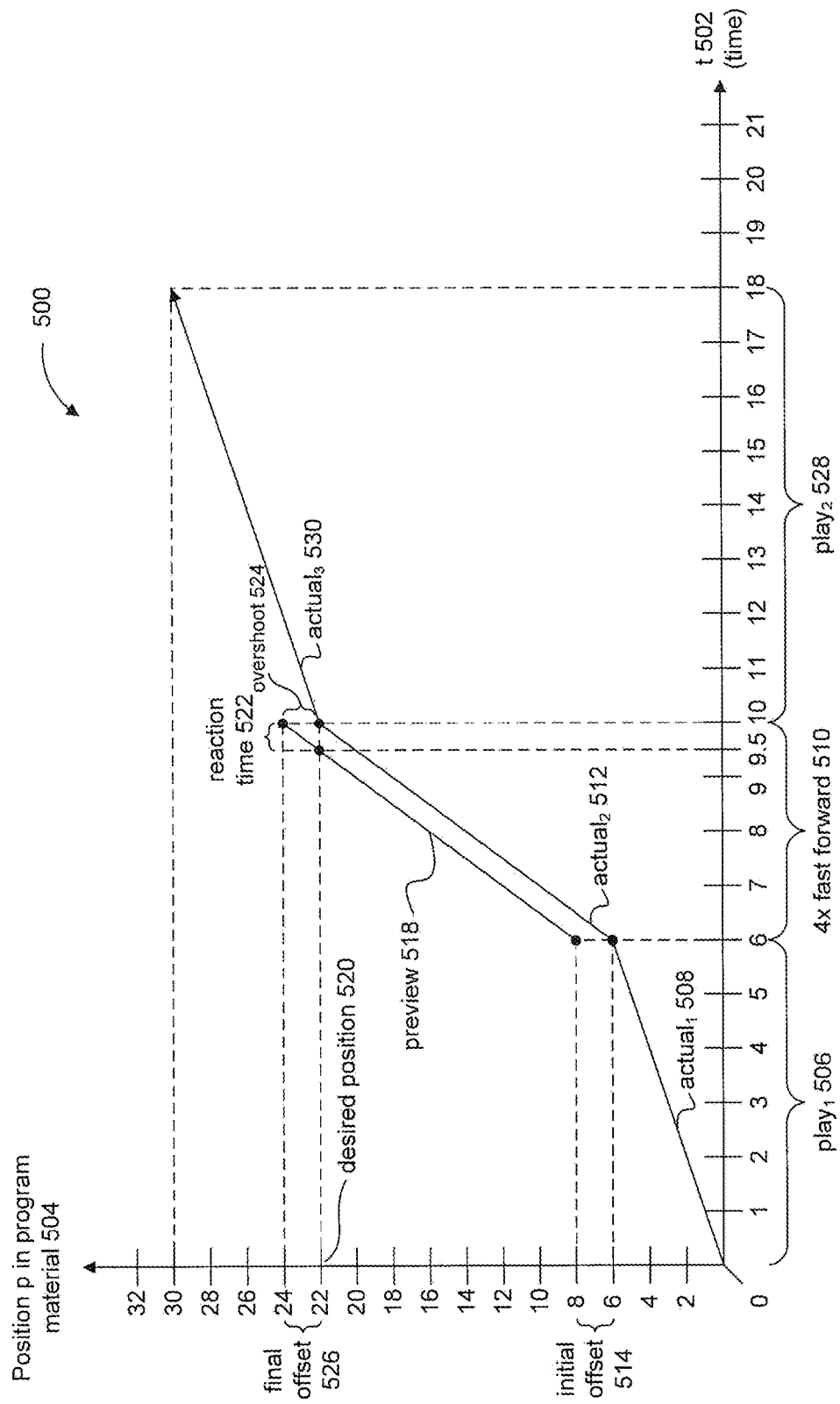
FIG. 5 is a diagram illustrating positions in program material over time associated with a trick mode according to an embodiment.

FIG. 5 is a diagram 500 illustrating positions p in program material 504 over time t 502 associated with a trick mode (4× fast forward 510) according to an embodiment. As illustrated, the vertical axis has been scaled by a factor of two in order to reduce the height of the diagram for convenience. Additionally, the illustrated origin has been chosen to correspond with time t=0 and program material position p=0. However, such choices are arbitrary for the sake of convenience in illustrating the relationship between changes in program material position 504 over changes in time 502 (e.g., the slope of the plotted display modes 506, 510, and 528).

At time t=0, program material is displayed using a play mode (play$_1$ 506). Accordingly, one second of program material 504 is displayed per second in time 502. The currently displayed program material at any instant in time corresponds to the current position in the program material 504. For example, at t=4 during play mode, the current position is p=4 in the program material 504. Actual positions in program material 504 (actual$_1$ 508) are tracked corresponding to a play mode. Accordingly, prior to initiating a trick mode (during play mode), the system tracks and updates positions for actual$_1$ 508, the current position, consistent with a 1/1 slope.

At time t=6, program material is displayed using a fast forward mode (4× fast forward 510). For example, the system has received a fast forward command from a user, causing the system to display program material at a rate of four seconds of program material 504 for every second of time 502. Accordingly, the slope of the diagram changes to 4/1 at time t=6. In the embodiment of FIG. 5, the system tracks and updates actual positions consistent with actual$_2$ 512, according to a rate equal to the 4× fast forward advancement of the program material. However, the system does not display the program material corresponding to actual$_2$ 512.

The system calculates an offset, used for displaying a preview. The offset can be calculated by determining a typical user reaction time and the mode used to display the program material. For the sake of convenience, a typical user reaction time 522 has been illustrated as a half second, from time t=9.5 to t=10. However, reaction times can vary depending on the user, and the system can further adjust the determination of the reaction time. As illustrated in FIG. 5, a constant offset of two seconds is used, such that an initial offset 514 is equal to a final offset 526. The offset is calculated by multiplying the nominal rate of program material displayed per time (4/1; corresponding to a nominal speed of 4×) by the user reaction time (0.5 seconds), which equals two seconds. The two second offset is added to actual$_2$ 512 to determine preview 518. As illustrated, preview 518 is shifted vertically from actual$_2$ 512 by the offset.

Positions in program material 504 corresponding to preview 518 are displayed to the user during 4× fast forward 510. Accordingly, when the user initiates fast forward, the position of program material displayed to the user at t=6 transitions from p=6 to p=8. The system then advances the preview 518 at a 4× fast forward rate. During the four seconds from t=6 to t=10, the system displays a preview of sixteen seconds worth of program material corresponding to positions p=8 to p=24.

As illustrated, the user is interested in viewing program material at normal playback speed starting at desired position 520, corresponding to position p=22 in program material 504. At time t=9.5, the 4× fast forward preview 518 displays the desired position 520. The user attempts to resume normal playback of program material.

However, due to the user's half second reaction time 522, the user issues a play command at time t=10. During the half second from t=9.5 to t=10, the 4× fast forward preview 518 has continued beyond the desired position 520 by a two second overshoot 524.

Accordingly, the system has intelligently compensated for overshoot 524 by calculating the two second offset used to display the preview 518 (4× fast forward), before or at the time the user issues a trick mode command. Final offset 526 effectively "cancels out" the overshoot 524 associated with the user terminating the preview 518 (displaying trick mode 4× fast forward 510).

At time t=10, the system receives a play command (play$_2$ 528) to terminate trick mode preview 518, although many other commands for terminating the current trick mode are supported (e.g., pause, stop, additional trick mode commands, etc.). The system terminates trick mode preview 518, and resumes playback according to the actual position. For example, at the time that trick mode preview 518 is terminated, the system sets the display position to the current actual position (e.g., by positioning the program material 504 according to the actual position). Positions associated with actual$_1$ 508, actual$_2$ 512, and actual$_3$ 530 transition seamlessly into each other. At time t=10, the actual position in program material 504 corresponds to p=22, i.e., the desired position 520. Accordingly, the system sets the current position to p=22 for resuming playback. The system thereby compensates for a user's reaction time 522, and associated overshoot 524, by displaying a preview 518 while similarly tracking and updating position actual$_2$ 512.

Embodiments can algorithmically calculate the actual position. The actual position can be calculated based on the initial actual position and the elapsed trick mode preview time. The actual position can be calculated upon termination of the trick mode, avoiding a need to update the actual position during display of the trick mode preview. The actual position can be calculated according to equation (1):

$$P_n = P_{n-1} + (R*T) \tag{1}$$

where $P_n$=new actual position, $P_{n-1}$=old actual position, R=rate of the trick mode (positive or negative), and T=elapsed time of the trick mode (positive). $P_{n-1}$ can be associated with initiating a trick mode, and $P_n$ can be associated with terminating that trick mode. Elapsed time of the trick mode T can be expressed as the difference in time between initiating the trick mode $T_{n-1}$ and terminating that trick mode $T_n$, i.e., $T=T_n-T_{n-1}$.

In the embodiment of FIG. 5, $P_{n-1}=6$ and R=4. $T=T_n-T_{n-1}=10-6=4$. The actual position $p=P_n$ associated with resuming playback of actual$_3$ 530 can be calculated according to equation (1) as $P_n=6+(4*(10-6))=22$. Accordingly, the system of FIG. 5 can calculate the actual position for displaying actual$_3$ 530 upon terminating preview 518, without a need to track positions of actual$_2$ 512 during display of trick mode preview 518.

The updated actual position also can be calculated for FIG. 5 upon terminating preview 518 using the following algorithm (4 corresponding to the 4× fast forward 510):

[new position]=[old position]+4*[elapsed time]

Figure 6:
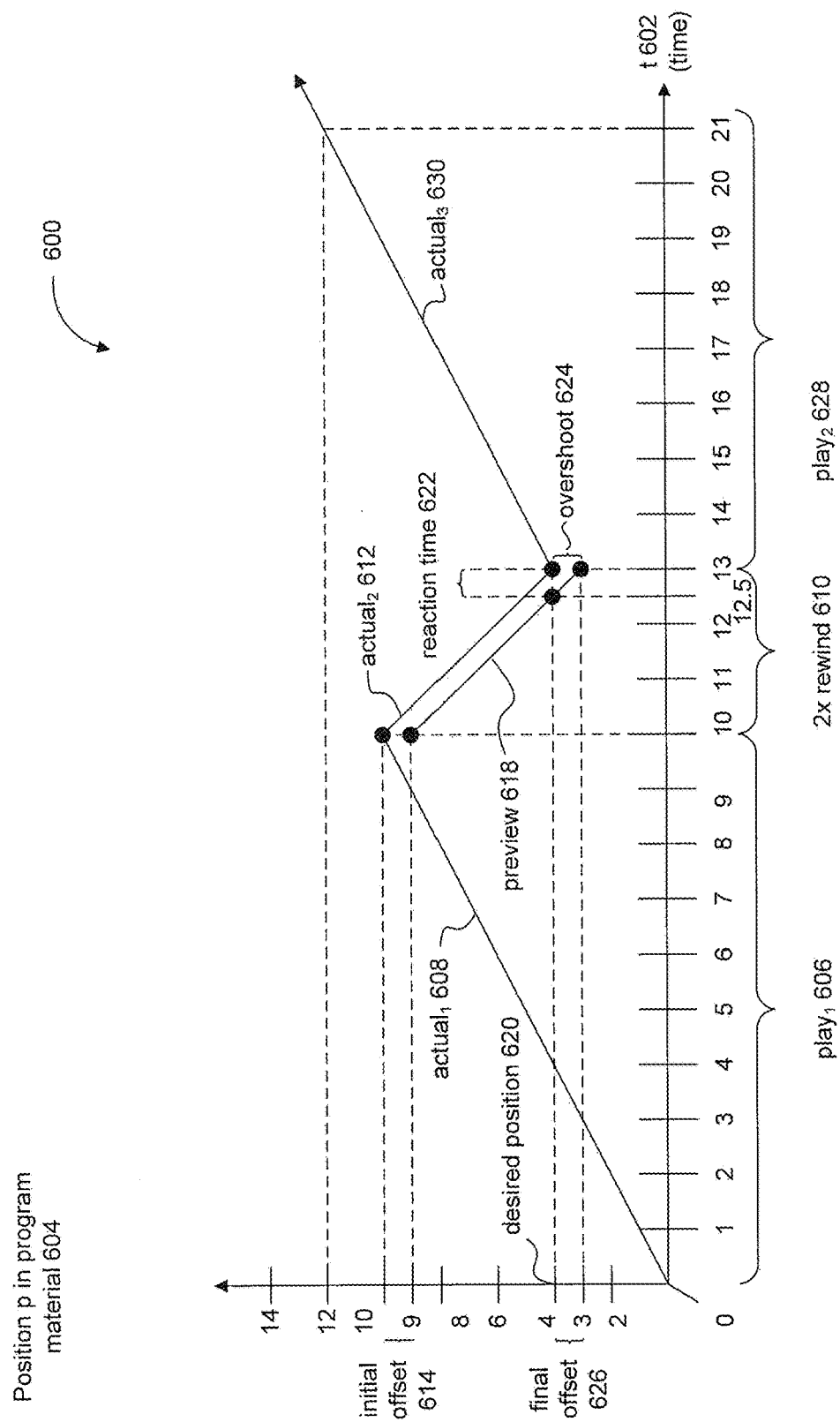
FIG. 6 is a diagram illustrating positions in program material over time associated with a trick mode according to an embodiment.

FIG. 6 is a diagram 600 illustrating positions p in program material 604 over time t 602 associated with a trick mode (2× rewind 610) according to an embodiment. In contrast to calculating a fast forward preview trick mode by adding an offset to the actual position, the rewind preview trick mode of FIG. 6 is calculated by subtracting an offset from the actual position.

At time t=0, program material is displayed using a play mode (play$_1$ 606). The system tracks and updates positions for actual$_1$ 608 corresponding to the displayed current position during a play mode.

At time t=10, program material is displayed using a rewind mode (2× rewind 610). The system displays program material at a rate of two seconds of program material 604 for every second of time 602, corresponding to the 2× rewind mode. Accordingly, the slope of the diagram changes from 1/1 to −2/1 at time t=10. In the embodiment of FIG. 6, the system tracks and updates actual positions consistent with actual$_2$ 612, according to a nominal 2× rewind speed. However, the system does not display the program material corresponding to actual$_2$ 612.

Rather, the system calculates an offset based on a typical user reaction time 622 and a nominal speed of the trick mode. As illustrated in FIG. 6, a constant offset of one second is used, such that an initial offset 614 is equal to a final offset 626. The offset is calculated by multiplying the rate of program material displayed per time (−2/1) by the user reaction time (0.5 seconds), which equals one second (negative, associated with subtraction). The one second offset is subtracted from actual$_2$ 612 to determine preview 618. As illustrated, preview 618 is shifted vertically from actual$_2$ 612 by the offset.

Positions in program material 604 corresponding to preview 618 are displayed to the user during 2× rewind 610. At time t=10, when the user initiates 2× rewind 610, the position of program material displayed to the user transitions from p=10 to p=9. The system displays the preview 618 starting at p=9, at a rate corresponding to a 2× rewind trick mode. During the three seconds from t=10 to t=13, the system displays six seconds of trick mode program material corresponding to positions p=9 to p=3. Positions for actual$_2$ 612 are separately tracked corresponding to displaying the trick mode.

At time t=12.5, the 2× rewind trick mode preview 618 displays desired position 620 of the program material 604. The user attempts to terminate the preview trick mode (resume normal playback of program material).

However, the user actually issues a play command at time t=13, responsive to viewing the desired position 620 at t=12.5 (due to the user's half second reaction time 622). During the half second from t=12.5 to t=13, the 2× rewind preview 618 has continued beyond the desired position 620 by a one second overshoot 624 corresponding to position p=3 in program material 604.

Accordingly, the one second offset calculated before or at the time the user issues the trick mode command is used to display the preview 618 (2× rewind) and compensate for a user's reaction time. Final offset 626 effectively "cancels out" the overshoot 624 associated with the user terminating the 2× rewind trick mode preview 618. A play command (play$_2$ 628) is illustrated as terminating the 2× rewind trick mode preview 618, although many other commands for terminating the current trick mode are supported (e.g., pause, stop, additional trick mode commands, etc.).

Upon termination, the system resumes playback at the tracked/updated actual position. For example, the system positions the program material 604 according to the actual position at the time that trick mode preview 618 is terminated. At time t=13, the actual position in program material 604 is p=4, i.e., the desired position 620. Accordingly, the system compensates for a users reaction time 622, and associated overshoot 624, by displaying a preview 618 while tracking/updating position actual$_2$ 612.

In some embodiments, it may be desirable to determine the preview using an offset that varies, e.g., begins at a smaller value (or zero value) and increases to a final value after an initial period in which the preview is displayed. A varying offset can address discontinuities. For example, transitioning from normal playback mode to a 20× fast forward mode using a constant offset may produce an undesirable discontinuity of ten seconds. More specifically, a predicted offset might be 10 seconds for a 20× fast forward mode, which represents a half second predicted reaction time multiplied by the nominal 20× trick mode speed. A user may not want to display a preview initially advanced by 10 seconds relative to normal playback upon initiating a trick mode. Using a varying offset and/or diverging from calculations based on nominal speeds can avoid such discontinuities, as explained with reference to FIGS. 7-9 below, for example.

Figure 7:
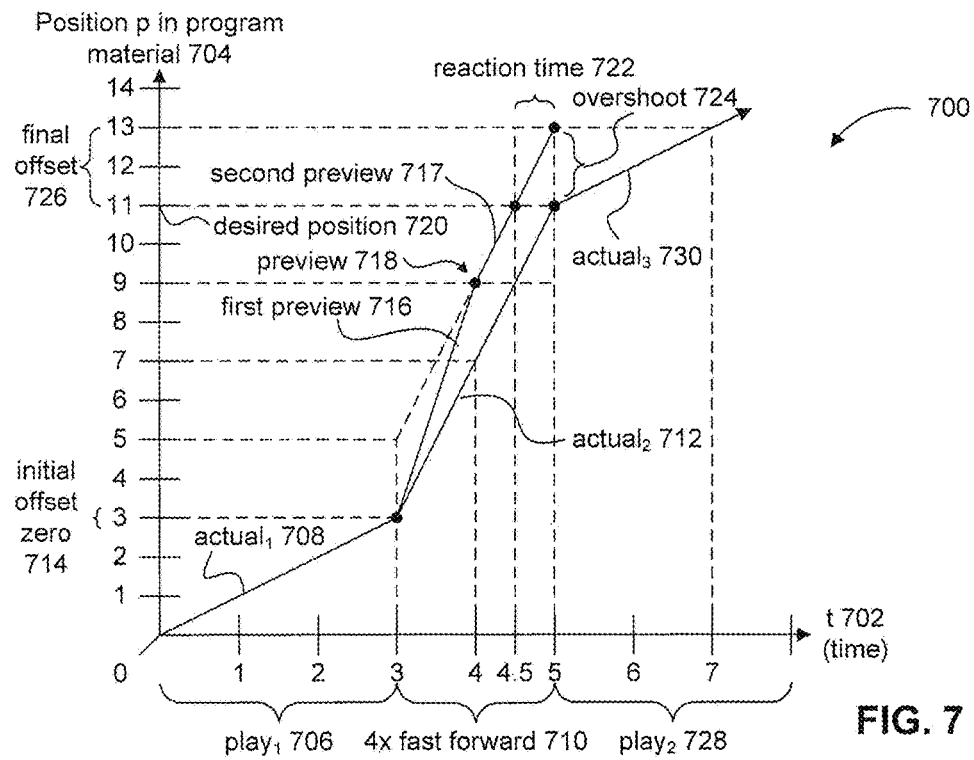
FIG. 7 is a diagram illustrating positions in program material over time associated with a trick mode according to an embodiment.

FIG. 7 is a diagram 700 illustrating positions p in program material 704 over time t 702 associated with a trick mode (4× fast forward 710) according to an embodiment. In contrast to previous embodiments, FIG. 7 illustrates a non-constant preview 718, including first preview 716 and second preview 717, associated with a 4× fast forward trick mode.

Starting at time t=0, the system displays program material 704 corresponding to positions p=0 to p=3 along actual$_1$ 708 according to display mode play$_1$ 706. A trick mode 4× fast forward 710 is initiated at time t=3. Positions p=3 to p=11 along actual$_2$ 712 are tracked/updated according to a rate and/or nominal speed associated with display mode 4× fast forward 710 over time 702 t=3 to t=5. An offset, e.g., final offset 726, is calculated corresponding to the trick mode display rate and/or nominal 4× speed and reaction time 722 of a half second.

The system of FIG. 7 uses a non-constant trick mode preview 718, which provides initial continuity between actual$_1$ 708 and preview 718 upon initiating the trick mode. An initial offset 714 is correspondingly smaller than final offset 726. In the illustrated embodiment, the positions for trick mode preview 718 are associated with two linear paths, corresponding to first preview 716 and second preview 717. At t=3, first preview 716 coincides with actual$_2$ 712, so the initial offset 714 is zero. First preview 716 is displayed at a rate slightly faster than the nominal trick mode speed of 4× fast forward 710. For example, first preview 716 corresponds to a 6× fast forward speed. Accordingly, during time t=3 to t=4 (a change in one second), positions p=3 to p=9 (six seconds of program material 704) are displayed during first preview 716. At time t=4, first preview 716 has achieved a two-second offset from actual₂ 712, shown as a transition to second preview 717 at p=9. At t=4, second preview 717 is displayed consistent with nominal trick mode speed of 4× fast forward 710. Accordingly, a slope of second preview 717 is parallel to a slope of actual₂ 712, maintaining the two second final offset 726 between second preview 717 and actual₂ 712.

At time t=4.5, preview 718 (i.e., second preview 717) displays desired position 720 (p=11) of the program material 704. Preview 718 continues displaying an additional two seconds of program material 704 (p=11 to p=13, corresponding to overshoot 724), due to the user's half second reaction time 722 from t=4.5 to t=5 at a trick mode speed of 4×.

At time t=5, the system receives the command to terminate preview trick mode 4× fast forward 710. The system switches to displaying program material 704 at a current position p=11 associated with actual₂ 712 at t=5. Accordingly, the system resumes playback at the desired position 720, proceeding along positions p=11 and onward associated with actual₃ 730 according to mode play₂ 728.

The non-constant preview 718 of FIG. 7 enables initial display of the preview 718 at a smaller offset, or a zero offset, from the actual position. The preview 718 is advanced at a rate that is faster than the nominal rate associated with the trick mode preview (e.g., 4× fast forward 710) during an initial period of the trick mode preview 718. A faster rate is illustrated by the steeper slope of preview 718 during the initial period (first preview 716). After the initial period, the slope of preview 718 transitions to a slope corresponding to the nominal rate of the trick mode, and both preview 718 and actual₂ 712 proceed thereafter at the same rate (parallel to each other). Thus, discontinuity can be minimized at the transition between the displayed program material of actual₁ 708 and the displayed trick mode preview 718.

The preview 718 and actual₂ 712 are tracked simultaneously and independently. Additional embodiments for first preview 716 and second preview 717 are possible. For example, first preview 716 can correspond to a 5× fast forward trick mode, switching to the nominal trick mode rate 4× after 2 seconds (when the 5× preview intercepts the line corresponding to the second preview 717 at 4× nominal rate, corresponding to the desired final offset between the preview and actual positions.

Figure 8:
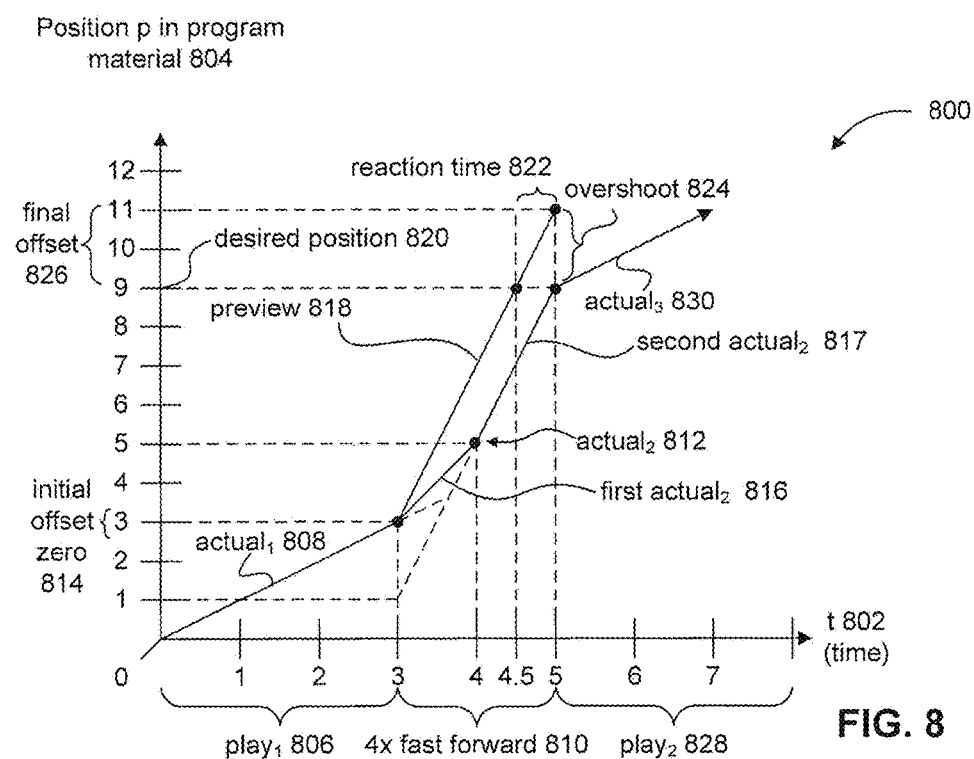
FIG. 8 is a diagram illustrating positions in program material over time associated with a trick mode according to an embodiment.

FIG. 8 is a diagram 800 illustrating positions p in program material 804 over time t 802 associated with a trick mode (4× fast forward 810) according to an embodiment. A non-constant actual₂ 812, including first actual₂ 816 and second actual₂ 817, is associated with preview 818 (4× fast forward 810 trick mode) having a nominal 4× fast forward speed.

Starting at time t=0, the system displays program material 804 corresponding to positions p=0 to p=3 along actual₁ 808 according to display mode play₁ 806. A trick mode 4× fast forward 810 is initiated at time t=3. Positions p=3 to p=11 along preview 818 are tracked/updated according to a rate associated with display mode 4× fast forward 810 over time 802 t=3 to t=5. An offset, e.g., final offset 826, is calculated corresponding to the trick mode display rate 4× and reaction time 822.

The system of FIG. 8 uses a non-constant actual₂ 812, providing initial continuity between actual₁ 808 and first actual₂ 816, and resulting in an initial offset 814 smaller than a final offset 826. As illustrated, initial offset 814 is zero, and final offset 826 is two seconds. At t=3, actual₂ 812 (first actual₂ 816) coincides with preview 818. First actual₂ 816 is tracked/updated at a rate slightly slower than the 4× rate that preview 818 is displayed (nominal trick mode speed of 4× fast forward 810). As shown, first actual₂ 816 corresponds to a 2× fast forward speed. Accordingly, during time t=3 to t=4 (a change in one second), positions p=3 to p=5 (two seconds of program material 804) are displayed during first actual₂ 816. At time t=4, first actual₂ 816 has achieved a two-second offset from preview 818, shown as an intersection with second actual₂ 817 at p=5. At t=4, first actual₂ 816 transitions to second actual₂ 817, consistent with nominal trick mode speed of 4× fast forward 810. Accordingly, a slope of second actual₂ 817 is parallel to a slope of preview 818, maintaining the two second final offset 826.

At time t=4.5, preview 818 displays desired position 820 of the program material 804 at p=9. Preview 818 continues displaying an additional two seconds of program material 804 (p=9 to p=11, corresponding to overshoot 824), due to the user's half second reaction time 822 from t=4.5 to t=5 at a trick mode speed of 4×.

At time t=5, the system receives the command to terminate trick mode 4× fast forward 810. The system switches to displaying program material 804 starting at a position p corresponding to actual₂ 812 (i.e., second actual₂ 817, the current position) at t=5, p=9. Accordingly, the system resumes playback at the desired position 820, proceeding along positions p=9 and onward associated with actual₃ 830 according to mode play₂ 828.

The non-constant actual₂ 812 of FIG. 8 enables the position of actual₂ 812 to initially advance at a rate 2× that is slower than the nominal rate associated with the trick mode preview 818 (e.g., a 4× rate of 4× fast forward 810) during an initial period of the trick mode preview 818. A slower rate is illustrated by a reduced slope of first actual₂ 816 during the initial period. After the initial period, the slope of actual₂ 812 transitions to a slope associated with the nominal rate of the trick mode, and both preview 818 and actual₂ 812 proceed thereafter at the same rate. Although not shown, variations in speeds, slopes, and number of speed/slope transitions are possible. Actual₂ 812 and preview 818 are initially synchronized, and then updated/tracked independently.

Embodiments can algorithmically calculate a non-constant actual position. The non-constant actual position can be calculated upon termination of the trick mode, avoiding a need to update the non-constant actual position during display of the trick mode preview. Upon termination, the actual position for a non-constant actual, including first through xth actuals, can be calculated according to equation (2):

$$P_n = P_{n-1} + (R_{1A} * T_{1E}) + (R_{2A} * T_{2E}) + \ldots + (R_{xA} * T_{xE}) \quad (2)$$

where $P_n$=new actual position, $P_{n-1}$=old actual position, $R_{1A}$=rate of the first actual (positive or negative), $T_{1E}$=elapsed time for first actual (positive), $R_{2A}$=rate of the second actual (positive or negative), $T_{2E}$=elapsed time for second actual (positive), . . . , $R_{xA}$=rate of the xth actual (positive or negative), $T_{xE}$=elapsed time for xth actual (positive). $P_{n-1}$ can be associated with initiating a trick mode, and $P_n$ can be associated with terminating that trick mode. Elapsed times $T_{1E} \ldots T_{xE}$ can be expressed as the difference in time between the start and end of each of the first through xth actuals.

In the embodiment of FIG. 8, the actual position $p=P_n$ associated with resuming playback of actual₃ 830 can be calculated according to equation (2). FIG. 8 illustrates preview 818 starting at old actual position $P_{n-1}=3$. First actual$_2$ 816 is associated with a 2× rate (R$_{1A}$=2) for times t=3 to t=4 (T$_{1E}$=4−3=1), and second actual$_2$ 817 is associated with a 4× rate (R$_{2A}$=4) for times t=4 to t=5 (T$_{2E}$=5−4=1). Therefore, P$_n$=3+(2*(4−3))+(4*(5−4))=9. Accordingly, the system of FIG. 8 can calculate the actual position for displaying actual$_3$ 830 upon terminating preview 818, without a need to track non-constant actual$_2$ 812 during display of trick mode preview 818. Although non-constant actual 812 includes only first and second actuals, equation (2) can be applied to embodiments having additional actuals.

The updated actual position also can be calculated for FIG. 8 upon terminating preview 818 using the following algorithm ([elapsed time]<=1 corresponding to the duration of first actual$_2$ 816):

if [elapsed time]<=1 then
    [new position]=[old position]+2*[elapsed time]
  else
    [new position]=[old position]+2+(4*([elapsed time]−1))

As in FIG. 7, the embodiment of FIG. 8 provides a continuity at the transition between the displayed program material of actual$_1$ 808 and the displayed trick mode preview 818. The overshoot 824 is compensated for by providing actual$_2$ 812 and preview 818 such that the fast forward preview 818 is "ahead" of actual$_2$ 812 by a precalculated offset. FIG. 7 and FIG. 8 are illustrated with respect to a fast forward trick mode. Similar embodiments can be provided with similar features used to implement rewind trick modes (e.g., a preview that lags behind the actual positions as in FIG. 6, for example).

Although not specifically illustrated, features from any of the foregoing embodiments can be combined. For example, the non-constant preview 718 of FIG. 7 can be combined with the non-constant actual$_2$ 812 of FIG. 8, while maintaining a final offset corresponding to predicted overshoot. Other additional combinations are possible. For example, the discontinuous transition to preview 518 of FIG. 5 can be combined with actual$_2$ 812 of FIG. 8 such that actual$_2$ 812 gradually diverges from the discontinuous preview 518. Embodiments can include preview 718 of FIG. 7 combined with a discontinuous actual$_2$ 812 (e.g., at t=3, switching to position p=1 and tracking actual positions p=1 to p=5 along the sloped dashed line in FIG. 8 between t=3 and t=4).

Figure 9:
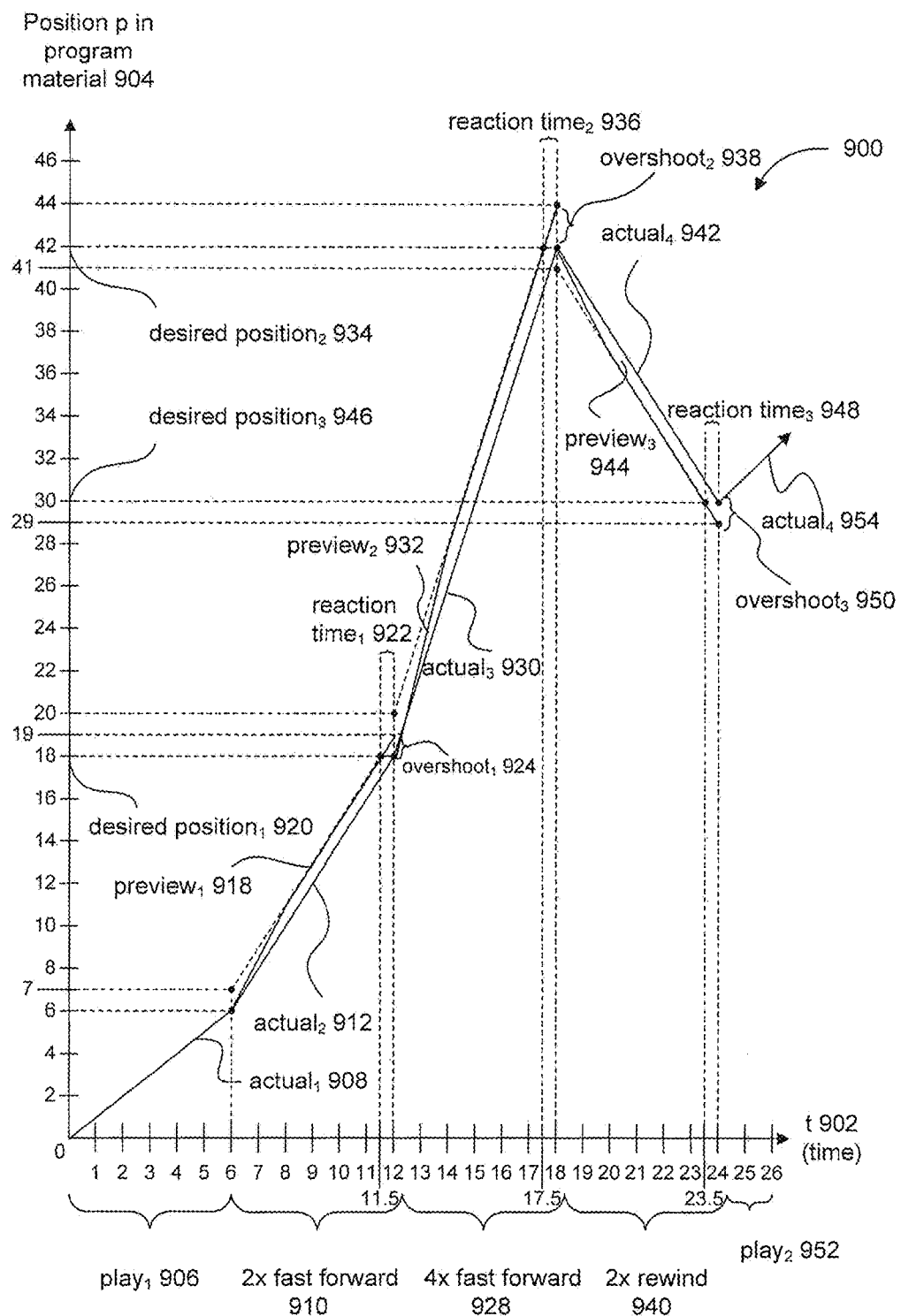
FIG. 9 is a diagram illustrating positions in program material over time associated with a series of trick modes according to an embodiment.

FIG. 9 is a diagram 900 illustrating positions p in program material 904 over time t 902 associated with trick modes according to an embodiment. FIG. 9 illustrates transitions between multiple different types of trick modes, and calculated offsets corresponding to different trick mode speeds.

At time t=0, program material 904 is displayed according to a play mode (play$_1$ 906) such that positions p=0 to p=6 of actual$_1$ 908 have a 1/1 slope. At time t=6, the system receives a fast forward command (2× fast forward 910). The system calculates a one second offset corresponding to overshoot$_1$ 924 based on reaction time$_1$ 922 and trick mode speed (2×). A non-constant preview$_1$ 918 is used for continuous display transition from actual$_1$ 908 to preview$_1$ 918. The system displays program material p=6 to p=19 according to 2× fast forward preview$_1$ 918, corresponding to a slope of 2/1.

At time t=11.5, the system displays desired position$_1$ 920 (p=18) using preview$_1$ 918. The system receives a command at t=12, consistent with a delay built into overshoot$_1$ 924, to initiate 4× fast forward 928. The system calculates a two second offset, compensating for the increased speed of 4× fast forward 928, and corresponding to overshoot$_2$ 938 based on reaction time$_t$ 936 and trick mode speed (4×). A non-constant preview$_2$ 932 is used for continuous transition from actual$_2$ 912 to preview$_2$ 932. The system displays program material p=18 to p=44 according to preview$_2$ 932 (4× fast forward), corresponding to a slope of 4/1.

At time t=17.5, the system displays desired position$_2$ 934 (p=42) using preview$_2$ 932, and receives a command at t=18, consistent with a delay built into overshoot$_2$ 938, to initiate 2× rewind 940. The system calculates a one second offset corresponding to overshoot$_3$ 950 based on reaction time$_3$ 948 and trick mode speed (2×). A non-constant preview$_3$ 944 is used for continuous transition from actual$_3$ 930 to preview$_3$ 944. The offset is subtracted because of a rewind trick mode (2× rewind 940). The system displays program material p=42 to p=29 according to preview$_3$ 944 (2× rewind), corresponding to a slope of −2/1.

At time t=23.5, the system displays desired position$_3$ 946 using preview$_3$ 944, and receives a command at t=24 to terminate trick mode 2× rewind 940 and resume normal playback according to play$_2$ 952, corresponding to a slope of 1/1. Normal playback proceeds according to actual$_4$ 954.

A variety of transitions between different display speeds can be used. Embodiments can use stepwise transitions between different discrete playback speeds. For example, trick mode preview 718 shown in FIG. 7 uses two different fast forward speeds. A stepwise series of more than two different fast forward speeds can be used. More specifically, during the initial period, a preview trick mode can transition between an initial 8× fast forward speed, to a 6× speed, and finally converge on a 4× fast forward speed. Further sub-increments of trick modes can be used when handling transitions, including differences of a single frame rate. Furthermore, smooth curves and other gradual transitions can be used. A variety of transitions also can be associated with tracking and updating actual positions.

Embodiments can include a fine tuning aspect related to determining a preview offset. As described herein, the system can calculate the offset based on the speed of the trick mode and an estimated reaction time of a user. The system can automatically track manual adjustments made by the user associated with terminating a trick mode. The system can fine tune its estimate of the user's reaction time and thereby determine a preview offset that is more consistent with a given user when initiating or terminating trick a mode. Accordingly, the system can minimize the user's need for manual adjustments.

The system can monitor and track multiple users, and customize particular reaction times on a per-user basis. For example, the system can utilize user accounts, biometric identification, and the like to provide customized expected offsets for each user. Additionally, manual adjustment and other fine tuning data obtained for one user can be applied to additional users, by updating predicted reaction times and corresponding preview offsets.

Embodiments can also collect manual adjustment and other fine tuning data from additional locations, e.g., from additional networked set top boxes. Additional fine tuning data can include, for example, identification of moments of interest within particular program material. A system can collect aggregate fine tuning data from multiple locations regarding particular program material, for example, as disclosed in U.S. patent application Ser. No. 12/773,513, filed May 4, 2010 and entitled "Aggregating Time-Delayed Sessions In A Video Delivery System," the contents of which are hereby incorporated by reference in full. An embodiment can utilize aggregate fine tuning data to adjust a preview offset for a given user, the system identifying that a user is initiating or terminating a trick mode near an identified moment of interest based on the aggregate data.

For example, embodiments can include a networked system that has visibility to many users viewing many programs. The system may track termination points selected by many users to recognize a common desired termination point associated with a specific program. The system may store that common termination point and subsequently use it to automatically adjust preview offsets and/or termination points for other users initiating a trick mode within the same program. The system can automatically terminate the trick mode at such a common termination point, when the user has requested termination within some predetermined proximity of the common termination point. Accordingly, the system automatically uses fine tuning adjustments made by prior users to help current and new users reach a desired location within the program. The system may additionally track the point at which users initiated a trick mode, and use the initiation point to distinguish between two nearby common termination points.

The position at which program material is displayed can vary slightly around a nominal display position, and can vary based on how display material is compressed. For example, the program material can be displayed according to a special frame of video, called an I-frame. An I-frame is a point at which a user could actually start to view the program material. Typically, if the nominal display position has been calculated as p=x, the actual display position can be from as little as p=(x−0.5) or less, to as much as p=(x+0.5) or more, based on typical variances including how the video is compressed and the location of I-frames.

Figure 10:
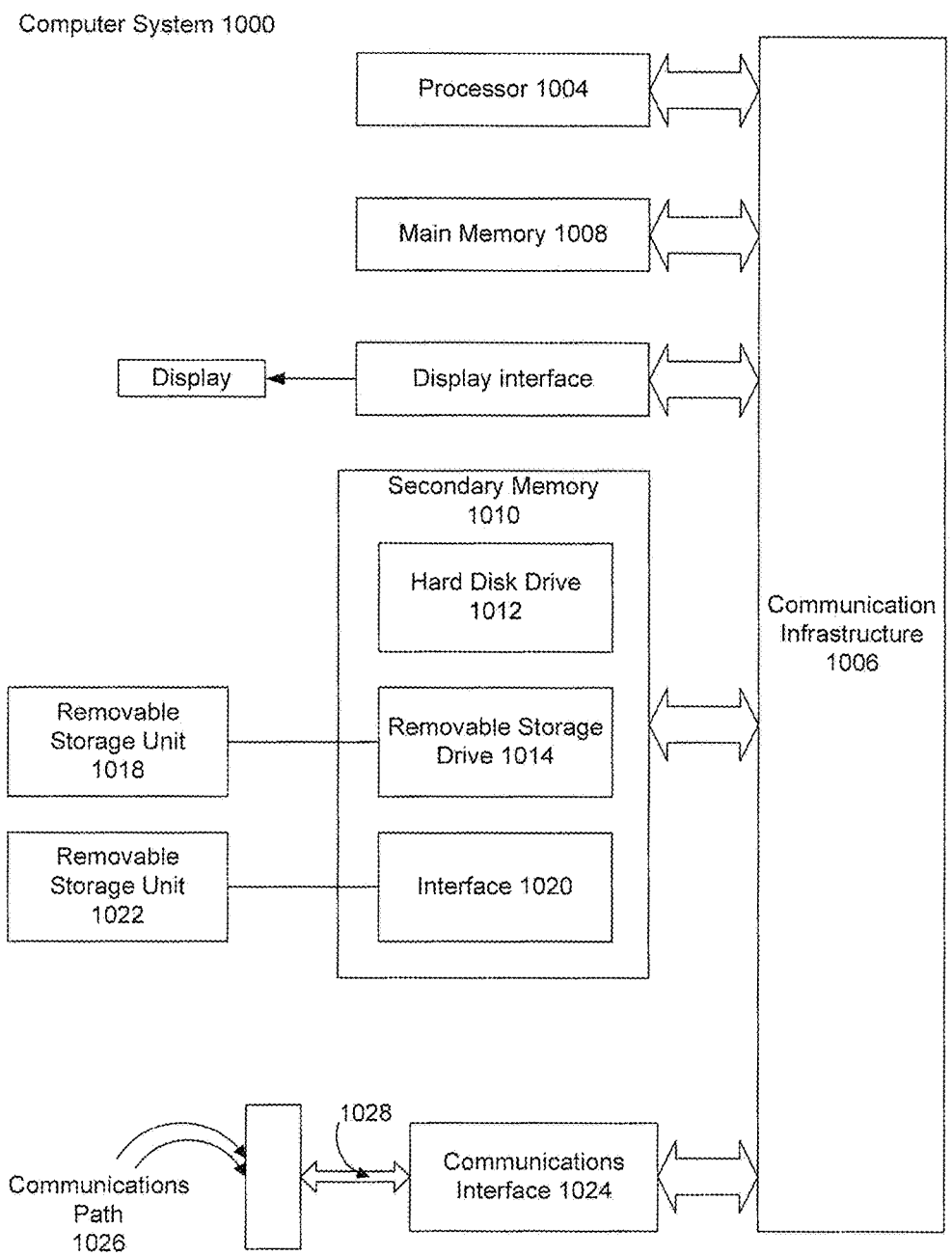
FIG. 10 is a block diagram of an exemplary computer system on which embodiments can be implemented.

FIG. 10 is a block diagram of an exemplary computer system 1000 on which embodiments can be implemented. Various aspects of the various embodiments can be implemented by software, firmware, hardware, or a combination thereof. FIG. 10 illustrates an example computer system 1000 in which an embodiment, or portions thereof, can be implemented as computer-readable code. Various embodiments are described in terms of this example computer system 1000. After reading this description, it will become apparent to a person skilled in the relevant art how to implement embodiments using other computer systems and/or computer architectures.

Computer system 1000 includes one or more processors, such as processor 1004. Processor 1004 can be a special purpose or a general purpose processor. Processor 1004 is connected to a communication infrastructure 1006 (for example, a bus or network).

Computer system 1000 also includes a main memory 1008, preferably random access memory (RAM), and may also include a secondary memory 1010. Secondary memory 1010 may include, for example, a hard disk drive 1012 and/or a removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a tangible computer readable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (e.g., an Ethernet card), a communications port, a PCMCIA slot and card, or the like. Software and data transferred via communications interface 1024 are provided to communications interface 1024 via a communications path 1026. Communications path 1026 may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement embodiments as discussed herein, such as the system described above. In particular, the computer programs, when executed, enable processor 1004 to implement the processes of embodiments. Accordingly, such computer programs represent controllers of the computer system 1000. Where embodiments are implemented using software, the software may be stored in a computer program product and loaded into computer system 1000 using removable storage drive 1014, interface 1020, hard drive 1012 or communications interface 1024.

Described above are systems, apparatuses, and methods for overshoot control, and applications thereof. It is to be appreciated that the Detailed Description section, and not the Abstract, is intended to be used to interpret the claims. The Abstract may set forth one or more but not all exemplary embodiments of the present invention as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for displaying program material, the system comprising:
   a memory configured to store the program material; and
   a processor configured to:
      receive a first command at a first position of the program material to initiate a trick mode,
      cause a first preview position of the program material to be displayed, the first preview position of the program material being offset in time relative to the first position of the program material by a positional difference,
      update the first position of the program material to a second position of the program material and the first preview position of the program material to a second preview position of the program material according to a rate of the trick mode, the second preview position of the program material being offset in time relative to the second position of the program material by the positional difference,
      cause the second preview position of the program material of the program material to be displayed,
      terminate the trick mode at the second preview position of the program material in response to receiving a second command to resume playback at the second preview position of the program material, the second position of the program material being less than the positional difference from the second preview position of the program material when playback of the program material is resumed at the second preview position of the program material, and
      cause playback of the program material to resume at the second position of the program material in response to the second command.

2. The system of claim 1, wherein the first position of the program material corresponds to a current position in the program material upon initiating the trick mode.

3. The system of claim 1, wherein the positional difference is associated with a reaction time of a user of the system to react to viewing the first position of the program material and to issue the second command to terminate the trick mode.

4. The system of claim 3, wherein the processor is further configured to multiply the reaction time of the user of the system and the rate of the trick mode to calculate the positional difference.

5. The system of claim 1, wherein the processor is further configured to adjust the first position of the program material based on the positional difference to determine the first preview position of the program material.

6. The system of claim 5, wherein the processor is further configured to add the first position of the program material and the positional difference to determine the first preview position of the program material.

7. The system of claim 5, wherein the processor is further configured to subtract the first position of the program material and the positional difference to determine the first preview position of the program material.

8. The system of claim 1, wherein the second position of the program material is at the second preview position when playback of the program material is resumed at the second preview position.

9. A method for displaying program material, the method comprising:
   receiving a first command at a first position of the program material to initiate a trick mode;
   causing a first preview position of the program material to be displayed, the first preview position of the program material being offset in time relative to the first position of the program material by a positional difference,
   updating the first position of the program material to a second position of the program material and the first preview position of the program material to a second preview position of the program material according to a rate of the trick mode, the second preview position of the program material being offset in time relative to the second position of the program material by the positional difference;
   causing the second preview position of the program material of the program material to be displayed;
   terminating the trick mode at the second preview position of the program material in response to receiving a second command to resume playback at the second preview position of the program material, the second position of the program material being less than the positional difference from the second preview position of the program material when playback, of the program material is resumed at the second preview position of the program material; and
   causing playback of the program material to resume at the second position of the program material.

10. The method of claim 9, wherein the first position of the program material corresponds to a current position in the program material upon initiating the trick mode.

11. The method of claim 9, wherein the positional difference is associated with a reaction time of a user of the system to react to viewing the first position of the program material and to issue the second command to terminate the trick mode.

12. The method of claim 11, further comprising:
   multiplying the reaction time of the user of the system and the rate of the trick mode to calculate the positional difference.

13. The method of claim 9, further comprising:
   adjusting, the first position of the program material based on the positional difference to determine the first preview position of the program material.

14. The method of claim 13, wherein the adjusting comprises:
   adding the first position of the program material and the positional difference to determine the first preview position of the program material.

15. The method of claim 13, wherein the adjusting comprises:
   subtracting the first position of the program material and the positional difference to determine the first preview position of the program material.

16. The method of claim 13, wherein the second position of the program material is at the second preview position when playback of the program material is resumed at the second preview position.

17. A system for displaying program material, the system comprising:
- a memory configured to store instructions for displaying the program material; and
- a processor configured to execute the instructions, the instructions, when executed by the processor, configuring the processor to:
    - receive a first command at a first position of the program material to initiate a fast forward trick mode,
    - determine a positional difference associated with a reaction time of a user of the system to react to viewing the first position of the program material and to issue a second command to terminate the fast forward trick mode,
    - add the first position of the program material and the positional difference to determine a first preview position of the program material,
    - cause the first preview position of the program material to be displayed,
    - update the first position of the program material to a second position of the program material and the first preview position of the program material to a second preview position according to a rate of the fast forward trick mode, the second preview position being offset in time relative to the second position of the program material by the positional difference,
    - cause the second preview position of the program material to be displayed,
    - terminate the fast forward trick mode at the second preview position in response to receiving the second command to resume playback at the second preview position, the second position of the program material being less than the positional difference from the second preview position when playback of the program material is resumed at the second preview position, and
    - cause playback of the program material to resume at the second position of the program material in response to the second command.

18. The system of claim 17, wherein the first position of the program material corresponds to a current position in the program material upon initiating the fast forward trick mode.

19. The system of claim 17, wherein the instructions further configure the processor to multiply the reaction time of the user of the system and the rate of the fast forward trick mode to calculate the positional difference.

20. The system of claim 17, wherein the second position of the program material is at the second preview position when playback of the program material is resumed at the second preview position.

* * * * *